April 28, 1964      M. GORSKI      3,130,596
GEAR SHIFTING MECHANISM
Filed Jan. 23, 1961      4 Sheets-Sheet 1
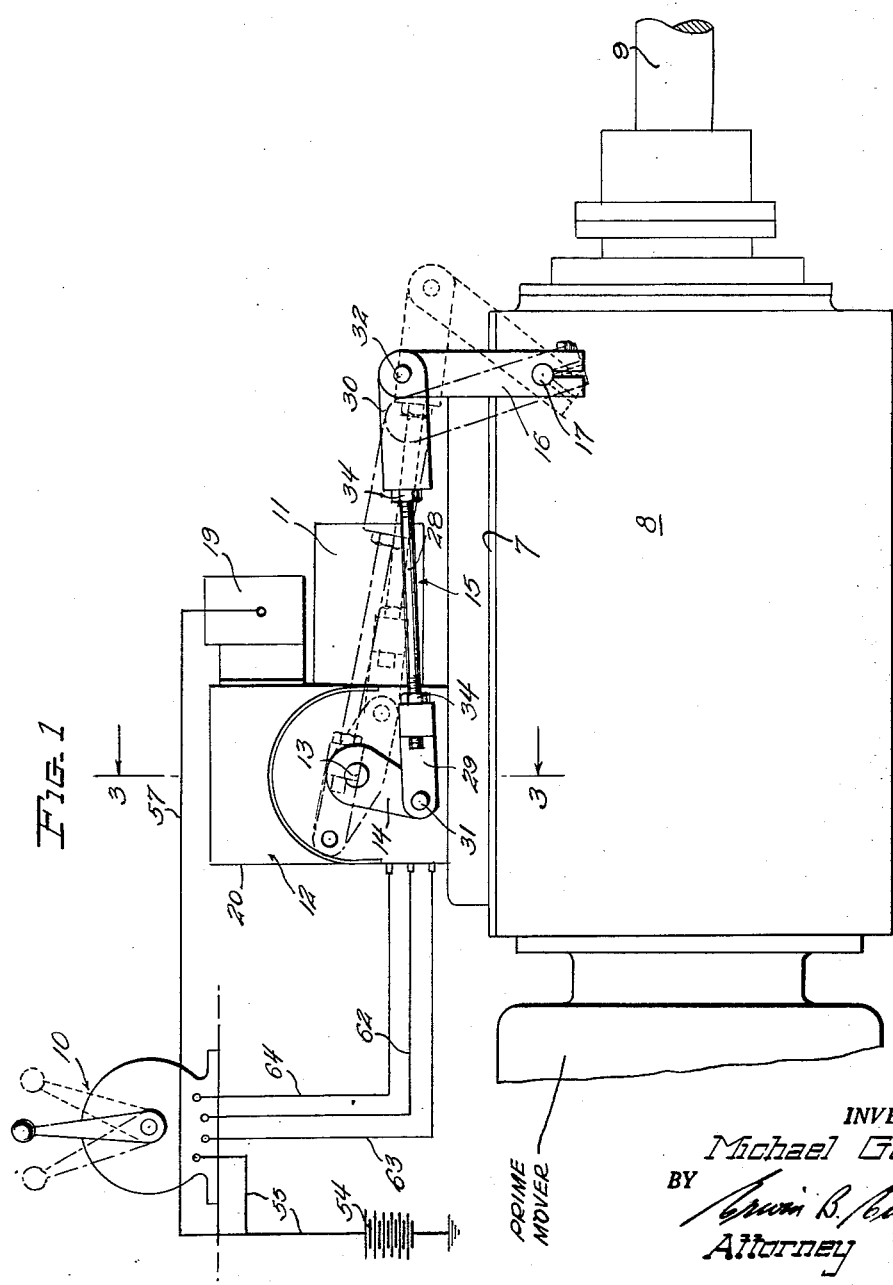
INVENTOR.
Michael Gorski
BY
Attorney

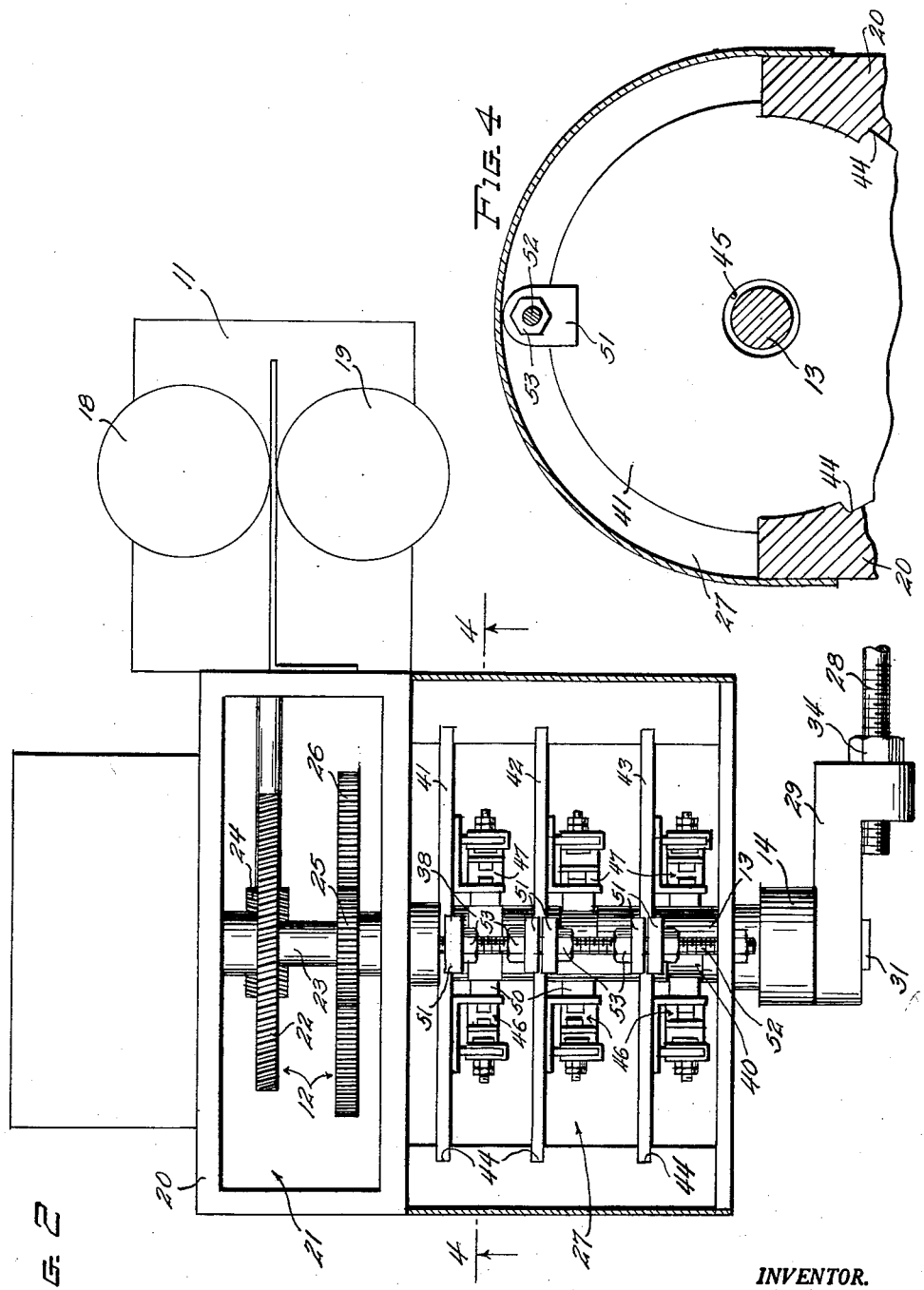

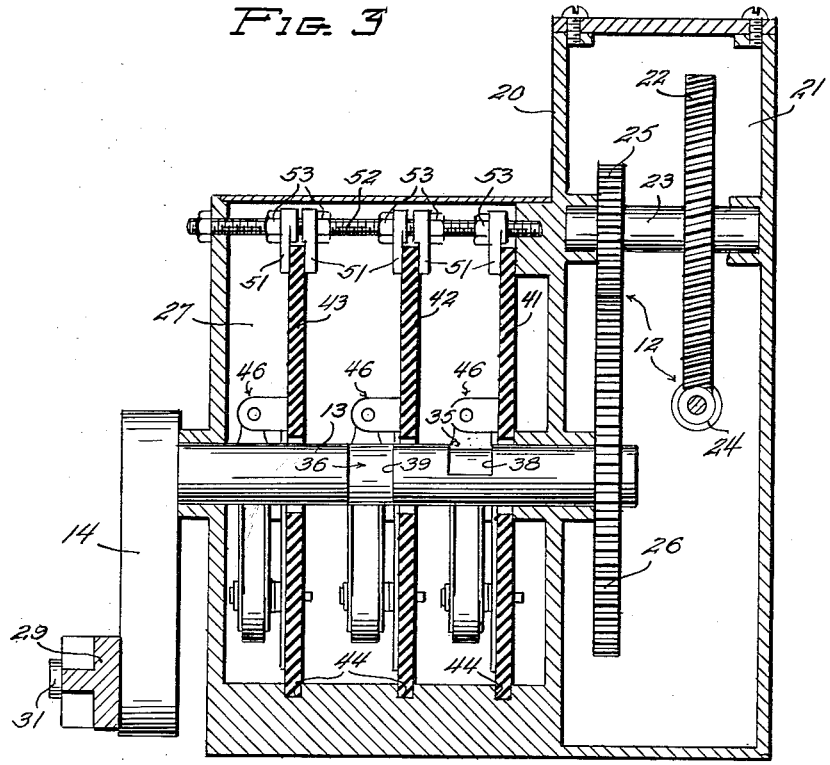

April 28, 1964   M. GORSKI   3,130,596
GEAR SHIFTING MECHANISM
Filed Jan. 23, 1961   4 Sheets-Sheet 4

INVENTOR.
Michael Gorski
BY
Attorney

United States Patent Office
3,130,596
Patented Apr. 28, 1964

3,130,596
GEAR SHIFTING MECHANISM
Michael Gorski, Milwaukee, Wis., assignor to Adlee Corp., New Berlin, Wis., a corporation of Wisconsin
Filed Jan. 23, 1961, Ser. No. 84,056
13 Claims. (Cl. 74—365)

This invention relates to a gear shifting mechanism adapted for general usage but intended primarily for use in conjunction with power transmissions in inboard motor boats.

While numerous forms of gear shifting mechanisms have been utilized in effecting the shifting of gears in marine power transmissions to afford their selective operation in "forward," "neutral" or "reverse" direction of propeller rotation, the majority of these devices have been complex in nature, expensive to manufacture and have contained numerous inherent shortcomings that have rendered them incapable of long continued satisfactory operation. Many of these devices have been purely mechanical in nature, some have combined hydraulic and mechanical means and others have combined electrical and hydraulic means for effecting the desired result.

To the best of my knowledge, each of the above types of gear shifting mechanisms have required frequent attention to maintain them in satisfactory operating condition and none of them have afforded completely satisfactory operation over an extended period of time by reason of oil leakage in the hydraulic mechanisms, variations of play resulting from wear in the mechanical mechanisms and the inability to control the operation of the electric motor with the required degree of accuracy to stop the gear shifting mechanism at a precise point to insure proper relationship of the driving gears at all times.

The primary object of the present invention is to provide a new and improved electro-mechanical gear shifting mechanism which will overcome the shortcomings of similar devices now in common use.

Another object resides in the provision of an electrically operated mechanical shifting mechanism adapted to be controlled from a remotely positioned manually operable selector switch.

Another object resides in the provision in an electro-mechanical gear shifting mechanism of a speed reducer adapted to reduce the normal high speed of the electric motor to the point where approximately one-half revolution of the power output shaft of the speed reducer is effective to shift the gear from "forward" through "neutral" to "reverse" position or vice versa.

Another object resides in the provision in an electric control circuit of a plurality of switches actuated by means positioned on the power output shaft of the gear reducer to effect the starting or stopping or reversing of the electric motor in accordance with the dictates of the positioning of the manually operable selector switch.

Another object resides in the provision of a plurality of independently mounted adjustably positionable switch carrying elements for adjusting the operating position of the several switches in a manner to control the operation of the electric motor with a degree of nicety required to insure the uniform and correct throw of the gear shift lever on each cycle of operation dictated by the positioning of the manually operable selector switch.

Another object resides in the provision of cam means on the power output shaft of the speed reducer operative in response to rotation of the shaft to effect the selected operation of the several switches to dictate and control the required operation of the motor in response to the positioning of the manually operable selector switch.

Another object resides in the provision of separate cam means on the power output shaft of the speed reducer for controlling the operation of the switches for each position "forward," "neutral" or "reverse" of the manually operable selector switch.

Another object resides in the provision of a pair of switches on each of the adjustably positionable elements to insure the effective operation of the control circuit to regulate the motor operation at all times, in a manner that insures the establishing and maintaining of the proper gear relationship in accordance with the selected positioning of the selector switch.

Other objects and advantages will become apparent from the following description of an illustrative embodiment of the present invention.

In the drawings:

FIGURE 1 is a side elevational view of an installation of the gear shifting mechanism, constructed in accordance with the teachings of the present invention, mounted on a cover of the reverse gear box that forms a part of a marine prime mover and power transmission and including a diagrammatic showing of a remotely positioned manually operable selector switch;

FIG. 2 is an enlarged top plan view of the high speed reversible electrical motor of the gear shifting mechanism together with its associated speed reducer, shown in FIG. 1 and circuit control means with parts broken away to more clearly illustrate their cooperative arrangement;

FIG. 3 is a vertical transverse sectional view, taken on line 3—3 of FIG. 1, showing the reduction gearing means and the associated relationship between the cam means on the power output shaft of the speed reducer and the adjustably positioned discs on which the circuit controlling switches are mounted;

Figure 5:
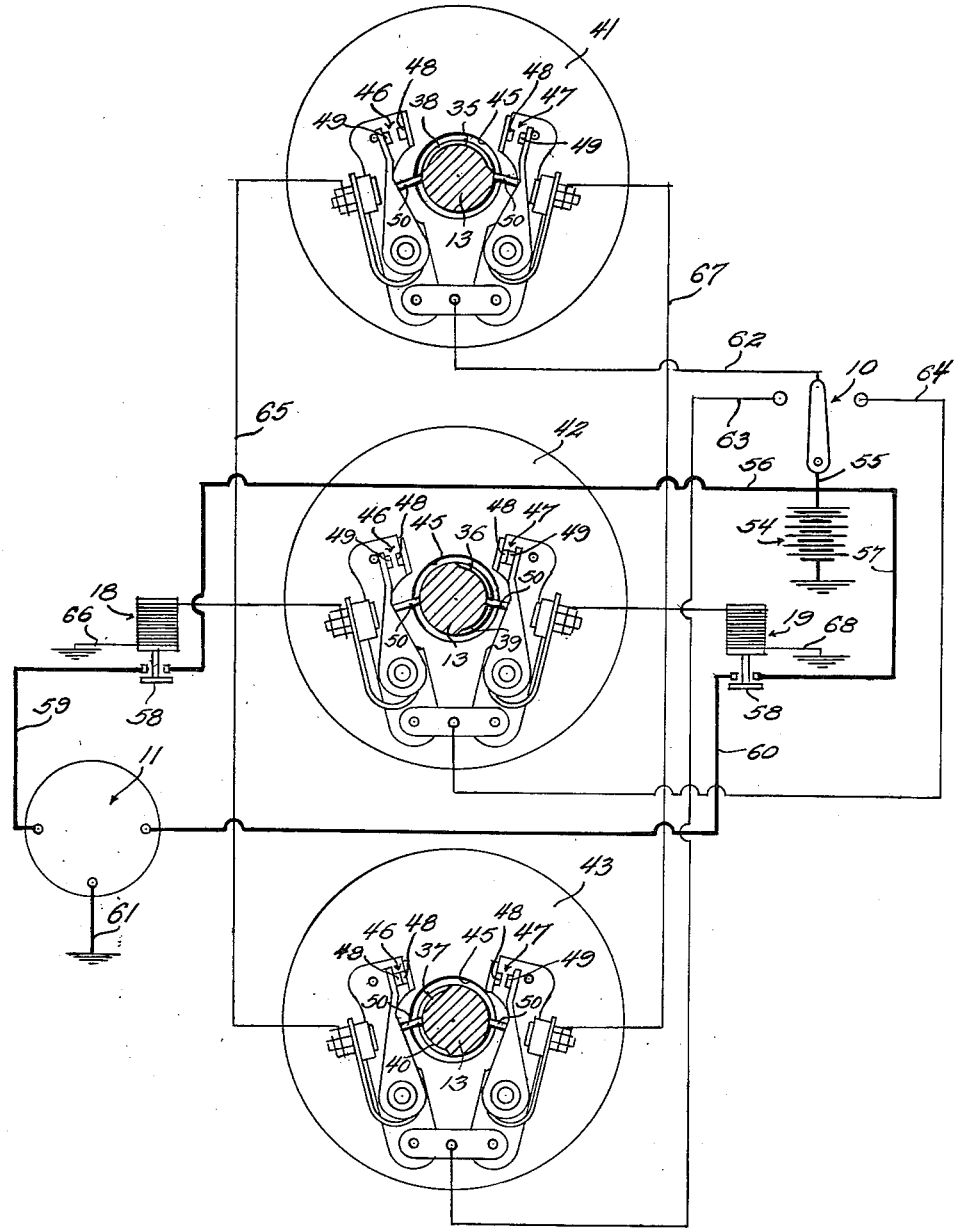

FIG. 4 is a vertical transverse sectional view, taken on the line 4—4 of FIG. 2, showing the clamping means for releasably retaining the "neutral" control disc in properly adjusted position; and FIG. 5 is a diagrammatic view showing the relationship between the cam means on the power output shaft of the speed reducer and the circuit controlling switches carried by the several control discs together with the wiring diagram of the power and control circuits of the device.

Before entering into a detail description of the present invention, it is believed that a brief discussion of the difficulty experienced in obtaining the required precise control of the gear shifting lever will serve to emphasize the marked advantages of the present electro-mechanical gear shifting mechanism of the present invention. The principal problem has arisen from the difficulty encountered in providing means whereby the movement of the gear shifting lever is always stopped at the precise position in which the selected proper relationship of the reversing gears is assured. In prior devices where mechanical linkage or hydraulic means or a combination of the two have been incorporated, wear or leakage flowing from extended use of the device have resulted in sufficient variation in the movement of the shifting lever to preclude the proper relationship of the reversing gears at the completion of a selected gear shifting operation.

The present invention provides an improved device that overcomes the shortcoming of prior devices by the incorporation of a combination of cooperating elements that are adjustably positionable to always function in a manner to arrest the movement of the gear shifting lever at the precise position in which the correct relationship between the reverse gears is assured in accordance with the dictates of the manually selected position of the control switch.

Referring more particularly to FIG. 1 of the accompanying drawings, it will be noted that the gear shifting mechanism, chosen for illustrative purposes and embodying the teachings of the present invention, is applied to the reverse gear box cover 7 of a marine power transmission 8 that includes a prime mover, reversing gear mechanism and a driven shaft 9.

The gear shifting mechanism of the present invention comprises essentially a manually operable selector switch 10 having three active positions "forward," "neutral" and "reverse" adapted for mounting in any suitable manner at a position remote from the reversing gear mechanism of the power transmission, a high speed reversible electric motor 11, a speed reducer 12 driven thereby and including a low speed power output shaft 13 on which an operating arm 14 is fixedly mounted and a motion transmitting linkage 15 that serves to establish a driving connection between the operating arm 14 and a gear shifting lever 16 fixedly attached to the exposed end of a shaft 17 on which the usual gear shifting fork (not shown) contained in the reverse gear box is mounted.

A pair of solenoid operated switches 18 and 19 suitably connected in a control circuit and with the windings of the motor 11 serve in a manner such that the closing of one of the switches effects rotation of the reversible high speed motor 11 in one direction and the closing of the other solenoid operated switch serves to effect rotation of the motor in the opposite direction.

The speed reducer 12 comprises a suitable housing 20 having a compartment 21 that contains the reduction gearing which includes a worm wheel 22 mounted on a shaft 23 and driven by a worm 24 fixedly mounted on the armature shaft of the motor 11 which is fixedly attached to the housing 20. A pinion 25 fixedly positioned on the shaft 23 in axially spaced relationship with the worm wheel 22 is disposed in meshing engagement with a gear 26 mounted on the low speed power output shaft 13 of the speed reducer 12. It is to be understood that any desired speed reduction may be incorporated between the reversible high speed motor 11 and the low speed power output shaft 13 of the speed reducer. The low speed power output shaft 13 which is rotatably journalled in the housing 20 extends through a compartment 27 and projects beyond the confines of the housing 20 to provide a mounting means for the operating link 14.

The motion transmission linkage 15 that serves to connect the operating arm 14 with the shift lever 16 comprises a threaded rod 28 and fitting 29 and a clevis 30. One end of the threaded rod 28 is adjustably positioned in a threaded aperture of the fitting 29, the other end of which is rockably supported on the stub shaft 31 carried by the free end of the operating arm 14. The other end of the threaded rod 28 is threadedly received in a bore formed in one end of the clevis 30 while the other end of the clevis spans the other end of the gear shifting arm 16 mounted on the exposed portion of the shaft 17 that carries the gear shifting fork. A clevis pin 32 serves to provide the rockable connection between the clevis 30 and the other end of the shifing lever 16. Suitable jam nuts 34 threaded on the rod 28 are tightened against the ends of the fitting 29 and the clevis 30 to provide the means by which the properly adjusted length of the motion transmitting link 15 is established and maintained.

A plurality of cam means 35, 36 and 37 which are disposed in axially spaced relationship on the shaft 13 and offset circumferentially from each othter serve to actuate switches, to be hereinafter more specifically described, for controlling the operation of the reversible motor 11 in response to the manual shifting of the selector switch 10 from one operating position to another. The cam means 35 serves to break the control circuit for high speed reversible motor 11 when the reverse gears have been shifted from "forward" or "reverse" positions to "neutral" in response to the movement of the selector switch to "neutral" position. The cam means 36 serves in a similar manner to disconnect the control circuit for the motor 11 when the reverse gears are meshed in "forward" position in response to the manual positioning of the selector switch in "forward" position. The cam means 37 serves in like manner to break the control circuit for the motor 11 when the reverse gears are meshed in "reverse" position in response to the dictates of the selector switch 10 when it is manually shifted to "reverse" position.

In the illustrated form of the present invention, wherein the gear shifting operation is effected by a one-half revolution of the power output shaft 13 of the speed reducer 12, the cam means 35, 36 and 37 comprise circumferentially disposed grooves 38, 39 and 40 formed in the shaft 13 each having a length of substantially one-half of the circumference of the power output shaft 13. It should be understood that the cam grooves 39 and 40 which are similar to the groove 38 are respectively circumferentially offset in opposite directions an amount of substantially 90° with respect to the cam means 37.

A plurality of discs 41, 42 and 43 formed of insulating material are respectively supported for rotatably adjustable positioning in parallel spaced grooves 44 formed in the lower portion of the housing 20 and disposed within the compartment 27. The discs 41, 42 and 43 are each provided with a central aperture 45 which surrounds the shaft 13 to permit free rotation of the shaft with respect to the several discs. The discs 41, 42 and 43 which are disposed in axially spaced relationship with each other are respectively positioned adjacent the cam means 35, 36 and 37. A pair of switches 46 and 47 are adjustably mounted on each of the discs 41, 42 and 43 on opposite sides of the shaft 13. The switches 46 and 47 are of the type commonly used in distributors in the automotive field and each comprises a fixed contact 48 and a movable contact 49. The movable contacts 49 are spring urged so that the switches are normally retained in closed position. Each of the movable contacts 49 are provided with a cam follower element 50 formed of insulating material having a portion adapted to lie in contact with either the surface of the shaft 13 or one of the cam grooves 38, 39 or 40. When a particular cam follower 50 is in contact with the surface of the shaft 13 the contacts 48 and 49 of the associated switch 46 or 47 are in open position and likewise when the cam follower 50 is disposed in one of the cam grooves 38, 39 or 40, the associated switch is in closed position.

The several axially spaced insulating discs 41, 42 and 43, each of which carry a pair of switches 46 and 47, are respectively releasably retained in desired position of rotational adjustment in the several grooves 44 for the purpose of establishing and maintaining the proper operating relationship between the cam means 35, 36 and 37 and the respective cam followers 50, mounted on each of the switches 46 and 47 to insure the proper operation of the switches to close the control circuit in a manner to initiate the rotation of the high speed reversible motor 11 in the desired direction dictated by the selected position of the switch 10 and to brake the control circuit at the completion of the selected gear shifting operation.

The means for releasably retaining the several insulating discs 41, 42 and 43 in properly adjusted rotational position in the grooves 44 (see FIG. 3) comprise a plurality of arms 51 slidably mounted on a threaded rod 52 supported in the compartment 27 of the housing 20. The several clamping arms 51 are retained in gripping engagement with the surfaces of the discs 41, 42 and 43 by tightening nuts 53 that are mounted on the rod 52.

The control circuit shown in FIG. 5 of the accompanying drawing indicates diagrammatically the position of the several cam means 35, 36 and 37 to respectively control the direction and amount of rotation imparted to the shaft 13 of the speed reducer 12 when the reversible motor 11 is energized through the movement of the manually operable selector switch 10 from one to another of its three operative positions.

The wiring diagram shown in FIG. 5 illustrates the condition of the control circuit when the selector switch is in "neutral" position. The control circuit comprises a source of electrical energy in the form of a battery 54 having one post grounded and the other post connected by a lead 55 to the blade of the selector switch 10. Branch leads 56 and 57 serve to respectively connect the lead 55 with one of the fixed contacts on each of the solenoid operated switches 18 and 19. The armature of each of the solenoid operated switches 18 and 19 is provided with a movable bridging contact member 58 which serves to close the solenoid switches 18 and 19 when the solenoids are energized in a manner to be hereinafter more specifically described. The other fixed contact of each of the solenoid operated switches 18 and 19 are respectively connected through wires 59 and 60 to one end of the field windings (not shown) of the reversible motor 11 to control the direction of rotation of the motor. The other end of each of the field windings is grounded through a wire 61.

The control circuit that serves to selectively energize the solenoid switches 18 and 19 comprises a lead wire 62 establishing electrical connection between the fixed "neutral" contact of the selector switch 10 and the two fixed contacts 48 of the respective switches 46 and 47 that are secured to the disc 41. In like manner, the fixed "forward" contact of the selector switch 10 is electrically connected to the fixed contacts 48 of the respective switches 46 and 47 carried by the disc 43 by a lead 63. Similarly, the "reverse" stationary contact of the selector switch 10 is electrically connected to the fixed contacts 48 of the respective switches 46 and 47 mounted on the disc 42 through a lead 64. The movable contacts 49 of the several switches 46 are electrically connected to a common wire 65 that leads to one end of the coil of the solenoid switch 18. The other end of the coil is grounded through a wire 66. Likewise, the movable contacts 49 of the several switches 47 are connected to a common wire 67 that leads to one end of the coil of the solenoid operated switch 19. The other end of the coil is connected to ground through a wire 68.

With the selector switch 10 in "neutral" position, as shown in full lines in FIG. 1 and the low speed power output shaft 13 of the speed reducer 12 in the position indicated in FIG. 5, the entire control circuit is in deenergized condition by reason of the fact that the cam follower 50 of both of the switches 46 and 47 mounted on the disc 41 are in contact with the surface of the shaft 13 so that both of the switches are held in open position.

When it is desired to establish "forward" operation of the power transmission, the selector switch 10 is thrown to forward position. This position of the selector switch establishes the control circuit between the battery 54 and the coil of the "forward" solenoid operated switch 18 through the medium of the closed switch 46 mounted on the disc 43. The closing of this circuit serves to actuate the armature of the solenoid of the switch 18 to move the bridging contact 58 thereof into circuit closing position to thereby energize the motor 11 to initiate its rotation in a clockwise direction to effect movement of the shifting arm 14 from its full line position (shown in FIG. 1) to its forward or dot-dash position shown therein. The clockwise rotation of the power output shaft 13 of the speed reducer 12 will continue though an angle of approximately 90° to a point at which the cam follower 50 will rise from the surface of its associated cam groove 40 to the surface of the shaft 13 thus causing the opening of the switch 46 mounted on the disc 43 to interrupt the flow of current through the control circuit and effect the stopping of the motor 11 when the gearing of the transmission is meshed for "forward" drive.

When it is desired to establish the "reverse" drive of the transmission, the manually operable selector switch 10 is thrown to "reverse" position in which the reverse solenoid operated switch 19 is energized through the then closed reversing switch 47 mounted on the disc 42 to energize the reversing solenoid to effect movement of the bridging contact 58 to close the control circuit between the battery 54 and the reverse windings of the motor 11 to cause the power output shaft 13 of the speed reducer 12 to rotate in a counterclockwise direction until such time as the cam follower 50 of the switch 47 mounted on the disc 42 effects the opening of the switch 47 caused by the movement of the cam follower 50 from its associated cam groove 39 to the surface of the shaft 13 at which time the control circuit through the coil of the reverse solenoid switch 19 is broken to effect the stopping of the motor and resultant stopping of the gear shifting operation when the gearing is in reverse position.

When it is desired to shift the transmission from "reverse" position to the "neutral" position the selector switch 10 is moved to the neutral position thus causing the control circuit to be established through the coil of the forward solenoid operated switch 18 by reason of the fact that the forward switch 46 on the disc 41 is in closed position. The resulting clockwise rotation of the power output shaft 13 of the speed reducer 12 will persist until such time as the cam follower 50 of the switch 46 carried on the disc 41 moves from the cam groove 38 to the surface of the shaft 13 to cause the interruption of the control circuit to stop further rotation of the motor 11 when the transmission gearing has reached its "neutral" position.

When it is desired to shift the power transmission from "reverse" to "forward" position, the selector switch 10 is moved to the "forward" position to establish the energization of the coil of the forward solenoid operated switch 18 to effect the closing of the power circuit from the battery 54 through the wire 56, the solenoid operated switch 18, the wire 59, through the forward windings of the motor 11 and ground wire 61 to effect the rotation of the power output shaft 13 of the speed reducer 12 in a clockwise direction to effect the movement of the gear shifting lever 16 to a position wherein the transmission gearing is meshed in "forward" position. It should be noted at this time that the extent of rotation of the power output shaft 13 of the speed reducer 12 is approximately one-half revolution as opposed to the substantial one-fourth revolution of the shaft 13 when the gear shifting movement is from "neutral" to either "forward" or "reverse" positions. The increased amount of rotation of the shaft 13 is obtained by reason of the fact that the cam follower 50 of the forward control switch 46 mounted on the disc 43 remains in contact with its associated cam groove 40 for the full length of the groove prior to rising to the surface of the shaft 13 at the completion of the substantial one-half revolution of the shaft 13 to effect the opening of the particular forward control switch 46 to break the control circuit and effect the deenergization of the motor at the completion of the selected gear shifting operation.

When it is desired to shift the power transmission from "forward" to "reverse" positions the selector switch 10 is moved to its "reverse" position wherein the control circuit is energized, in the manner previously described to effect the closing of the reverse solenoid operated switch 19 to establish the power circuit from the battery 54 through the reverse windings of the motor 11 in a manner previously described. In effecting the shifting of the power transmission from forward to reverse positions it will be noted that the power output shaft 13 of the speed reducer 12 rotates in a counterclockwise direction through approximately one-half revolution under the control of the reverse switch 47 mounted on the disc 41.

The diametrically opposed relationship between the cam followers 50 of the forward and reverse switches 46 and 47 respectively coupled with the arrangement of the respective cam means serves to insure against the overrunning of the reversible motor at the completion of the selected gear shifting operation.

The fact that the cam followers 50 of the forward and reverse switches 46 and 47 respectively are disposed at diametrically opposite sides of the shaft 13 coupled with the fact that the length of the grooves of each of the cam means is substantially one-half the circumference of the shaft 13 establishes a relationship that insures the simultaneous closing of one of the control switches 46 or 47 immediately upon the opening of the other control switch carried by the particular insulating disc. The establishment of this relationship positively precludes the overrunning of the shaft 13 and its associated linkage so that movement of the gear shifting lever 16 is stopped at the precise instant at which the selected position of the reverse transmission is reached.

In order to accomplish this nicety of operation, there is an instantaneous position in which both of the control switches 46 and 47 are retained in open position which effects the breaking of the control and power circuits at the precise time at which the selected gear positioning operation has been reached.

While the arrangement and operation of the gear shifting mechanism have been described in considerable detail in the foregoing specification, it is believed that a brief discussion of the simplicity with which the unit may be mounted and the ease with which the length of the motion transmitting linkage 15 may be adjusted for application between the operating arm 14 of the unit and the gear shift lever 16 will serve to emphasize the facile manner in which the unit may be installed and placed in operating condition. It is to be understood that the wiring of the device and initial positioning of the switch carrying discs 41, 42 and 43 are made at a time of its original assembly. The manually operable selector switch 10 is adapted for pedestal or dash board mounting at any suitable position remote from the unit and a suitable cable is provided so that the selector switch may be electrically connected to the unit. In the illustrated form of the invention, shown in FIG. 1, the unit is fixedly attached to the cover plate of the gear housing in a manner such that a stub shaft 31 carried by the operating arm 14 and the shift lever 16 are disposed substantially in a common plane. As shown in full lines in FIG. 1, the gear shift lever 16 is secured to the shaft 17 in a substantially vertical position when the gears are meshed in "neutral" position. The selector switch 10 is then moved to "forward" position and the shaft 13 of the speed reducer is rotated in a clockwise direction to a position where it is stopped by the opening of the switch 46 carried by the disc 43.

The shifting lever 16 is then manually moved in a counterclockwise position to establish the meshing engagement of the reversing gears in "forward" position. The operating arm 14 is then fixedly attached to the shaft 13 of the speed reducer 12 so that the pin 31 is at its most remote position from the clevis pin hole formed in the lever 16. In order to avoid any undue strain on the motion transmitting means 15, the arm 14 is rotated to a position slightly above the dead center point between the clevis pin hole of the lever 16 and the shaft 13. The arm 14 is then fixedly secured to the shaft 13 in its properly adjusted position. With the shaft lever 16 and operating arm 14 in the above described position, the distance between the axis of the clevis pin hole in the lever 16 and the axis of the stub shaft 31 is carefully measured. The fitting 29 and the clevis 30 are then threaded on the rod 28 to a position in which the distance between the pin receiving opening in the fitting 29 and the pin receiving opening in the clevis 30 is equal to the previously measured distance between the pin 31 and the pin receiving hole formed in the lever 16. At this time, the jam nuts 34 are respectively tightened against the ends of the fitting 29 and the clevis 30 to retain the motion transmitting linkage at its properly adjusted length so that the motion transmitting linkage may be properly positioned between the arm 14 and the lever 16. The positioned motion transmitting linkage 15 is then re- moved from the arm 14 and lever 16 and the lever 16 is swung into clockwise direction to its "reverse" position (shown in dotted lines in FIG. 1). The selector switch 10 is then thrown to its dotted line or "reverse" position shown in FIG. 1 and the high speed reversible motor is thereby energized to effect counterclockwise rotation of the shaft 13 of the speed reducer 12 to rotate the arm 14 to the dotted line position shown in FIG. 1 in which the circuit to the solenoid operated switch 19 is broken by the movement of the cam follower 50 from the cam groove 39 to the surface of the shaft 13 at which time the switch 47 carried by the disc 42 is moved to its open circuit breaking position. The motion transmitting linkage 15 is then applied between the arm 14 and the lever 16. In the event that the motion transmitting linkage cannot easily be applied to form connection between the arm 14 and lever 16, the position of the disc 42 may be rotatably adjusted so that the switch 47 carried by the disc 42 will effect the stopping of the counterclockwise movement of the arm 14 at a position such that the motion transmitting linkage may be properly connected between the arm 14 and the lever 16. After this proper adjustment has been made, the nuts 53 mounted on the threaded rod 52 may be tightened to effect the clamping of the disc to retain it and the switches 46 and 47 in properly adjusted relationship with the associated cam means on the shaft 13.

The motion transmitting linkage 15 is again removed from the arm 14 and lever 16 and the lever 16 is manually moved to "neutral" position. The selector switch is then moved to "neutral" position to effect rotation of the shaft 13 in a clockwise direction to its "neutral" position. The motion transmitting linkage is then reapplied to the arm 14 and lever 16. If the relative positions between the arm 14 and lever 16 fail to properly accommodate the motion transmitting linkage 15, the disc 41 may be rotatably adjusted, in a manner previously described, to establish the correct distance between the arm 14 and lever 16 to permit the ready application of the motion transmitting linkage 15 between the arm 14 and lever 16.

With the several discs 41, 42 and 43 properly adjusted with respect to their associated cam means and the motion transmitting linkage 15 connected between the arm 14 and lever 16, the device is in readiness for operation and the manual shifting of the selector switch 10 to desired operating position will effect the automatic shifting of the reverse gears to the position dictated by that of the selector switch 10.

From the foregoing description of the gear shifting mechanism and its operation, it will readily be seen that a simple and effective mechanism has been provided wherein the reversing gears of the transmission may be selectively and automatically effected by the manual shifting of the selector switch 10.

Should dual control be desired, a second manual operable selector switch 10 may be incorporated in the system without altering its mode of operation.

While the invention has been described in considerable detail in the foregoing specification, it is to be understood that various changes may be made in its embodiment without departing from or sacrificing any of the advantages hereinafter claimed.

I claim:
1. A control system for the operation of a power transmission including a prime mover, reversible gearing and a driven shaft, said control system comprising an arm shiftable to establish the desired forward, neutral or reverse operation of said power transmission, a manually operable selector switch having forward, neutral and reverse positions, a high speed reversible electric motor, a source of power for said motor, a control circuit for said motor, a speed reducer driven by said motor, a low speed power output shaft in said speed reducer, an operating arm fixedly attached to said power output shaft, a motion transmitting link connecting said shiftable and operating arms, a plurality of axially spaced cam means on said power output shaft, said cam means controlling the neutral, forward and reverse operation of said motor, a separate rotatably adjustable member disposed adjacent each of said cam means, a pair of normally closed switches mounted on each of said rotatably adjustable members, each of said switches including fixed and movable electrical contacts, a cam follower mounted on each of said movable contacts, and electrical connections placing said switches in said control circuit whereby the manual shifting of said selector switch from one position to another serves to close said control circuit and energize said motor to effect rotation of said power output shaft and movement of said shiftable arm until such time as one of said cam means effects the opening of one of said switches to break the control circuit and thereby deenergize said motor when said selected gear shifting operation has been completed, the separate switches of each pair controlling the opposite directions of rotation of said motor, said cam means actuating one of said switches immediately after actuating the other said switch to preclude overrun of the shaft.

2. A control system, as defined in claim 1, in which said pair of said switches on each of said adjustably mounted members are disposed on opposite sides of said power output shaft.

3. A control system, as defined in claim 1, in which said respective axially spaced cam means on said power output shaft are circumferentially spaced with respect to each other.

4. A control system, as defined in claim 1, in which each of said cam means is effective through an angle of substantially 180° rotation of said power output shaft.

5. A control system, as defined in claim 1, in which the angular positions of the forward and reverse cam means are offset at an angle of substantially 90° in opposite directions from the position of the neutral cam means.

6. The combination with a power transmission including a prime mover, reversible gearing, a driven shaft, and a shifting arm movable to selectively place the transmission is desired position, of a control system therefor, said control system comprising a remotely positioned manually operable selector switch having neutral, forward and reverse positions, a high speed reversible electric motor, a source of power for said motor, a control circuit for said motor, a power output shaft driven by said motor, speed reduction gearing between said motor and said power output shaft whereby said power output shaft is rotated at a relatively slow speed, an operating arm fixedly attached to said power output shaft, a motion transmitting link connecting said shifting and operating arms, a plurality of axially spaced separate cam means on said power output shaft, said separate cam means respectively controlling the neutral, forward and reverse operation of said motor, a separate rotatably adjustable member disposed adjacent each of said cam means, a pair of normally closed switches mounted on each of said rotatably adjustable members, said switches being disposed at opposite sides of said power output shaft, each of said switches including fixed and movable contacts, a cam follower fixedly attached to each of said movable contacts, and electrical connections placing said switches in said control circuit whereby the manual shifting of said selector switch from one position to another serves to close said control circuit and energize said motor to effect rotation of said power output shaft and movement of said shifting arm until such time as one of said cam means effects the opening of one of said switches to break the control circuit and thereby deenergize said motor when said selected gear shifting operation has been completed, the separate switches of each pair controlling the opposite directions of rotation of said motor, said cam means actuating one of said switches immediately after actuating the other said switch to preclude overrun of the shaft.

7. The organization, as defined in claim 6, in which each of said separate cam means is effective through an angle of substantially one half revolution of said power output shaft.

8. The organization, as defined in claim 6, in which said respective axially spaced separate cam means on said power output shaft are circumferentially spaced with respect to each other.

9. The organization, as defined in claim 6, in which the forward and reverse cam means are offset at an angle of substantially 90° in opposite directions from the position of the neutral cam means.

10. A manually operable selector means for controlling the automatic gear shifting operation in a power transmission including a prime mover, reversible gearing, a driven shaft and shifting arm movable to selectively place the transmission in desired position, said manually operable means comprising a selector switch having neutral, forward and reverse positions, a high speed reversible electric motor, a speed reduction gearing driven thereby and including a low speed power output shaft, an operating arm fixedly attached to said low speed power output shaft, a motion transmitting link connecting said operating and shifting arms, a plurality of axially spaced cam means on said shaft, a separate rotatably adjustable member disposed adjacent each of said cam means, a pair of normally closed switches mounted on each of said rotatably adjustable members, one of each of said pair of switches serving to control the rotation of said motor in one direction, the other of each of said pair of switches serving to control the rotation of said motor in the opposite direction, said cam means actuating one of said switches immediately after actuating the other said switch to preclude overrun of the shaft, said switches being disposed at opposite sides of said power output shaft, each of said switches including fixed and movable electric contacts, a cam follower fixedly attached to each of said movable contacts, yieldable means for retaining said cam followers in constant contact with its associated cam means, a control circuit for said motor, and electrical connections placing said switches in said control circuit in a manner whereby the manual shifting of said selector switch from one position to another serves to complete said control circuit to initiate rotation of said power output shaft in a direction dictated by the closed switch on one of said rotatably adjustable members, the rotation of said power output shaft continuing to the point at which one of said cam means effects the opening of one of said switches to interrupt the established control circuit when said selected gear shifting operation has been completed.

11. A manually operable selector means, as defined in claim 10, in which said respective axially spaced cam means on said power output shaft are circumferentially spaced with respect to each other.

12. A manually operable selector means, as defined in claim 10, in which each cam means is effective through an angle of substantially 180° rotation of said power output shaft.

13. A manually operable selector means, as defined in claim 10, in which the circumferentially spaced positions of the forward and reverse cam means are offset at an angle of sustantially 90° in opposite directions from the position of said neutral cam means.

References Cited in the file of this patent

UNITED STATES PATENTS

| | | |
|---|---|---|
| 2,248,564 | Wood | July 8, 1941 |
| 2,863,011 | Mallory | Dec. 2, 1958 |
| 2,938,085 | Andrews | May 24, 1960 |

UNITED STATES PATENT OFFICE
CERTIFICATE OF CORRECTION

April 28, 1964

Patent No. 3,130,596

Michael Gorski

It is hereby certified that error appears in the above numbered patent requiring correction and that the said Letters Patent should read as corrected below.

Column 3, line 64, for "othter" read -- other --; column 5, line 63, for "though" read -- through --; column 9, line 43, for "is" read -- in --.

Signed and sealed this 8th day of September 1964.

(SEAL)
Attest:

ERNEST W. SWIDER
Attesting Officer

EDWARD J. BRENNER
Commissioner of Patents